US008019905B2

(12) United States Patent
Wu et al.

(10) Patent No.: US 8,019,905 B2

(45) Date of Patent: Sep. 13, 2011

(54) VIDEO/GRAPHICS PORT ADAPTER AND METHOD THEREOF

(75) Inventors: Shuguang Wu, Round Rock, TX (US); Thomas P. Lanzoni, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 393 days.

(21) Appl. No.: 12/029,013

(22) Filed: Feb. 11, 2008

(65) Prior Publication Data

US 2009/0201312 A1 Aug. 13, 2009

(51) Int. Cl.
*G06F 3/00* (2006.01)

(52) U.S. Cl. .............................. 710/14; 710/33; 345/214

(58) Field of Classification Search .................... 710/14, 710/33; 345/214

See application file for complete search history.

(56) References Cited

U.S. PATENT DOCUMENTS 6,020,931 A * 2/2000 Bilbrey et al. ................ 348/584
2006/0083239 A1* 4/2006 Kobayashi ..................... 370/389
2006/0267992 A1* 11/2006 Kelley et al. .................. 345/502
2008/0007552 A1* 1/2008 Diamond et al. ............. 345/418
2008/0250184 A1* 10/2008 Sheafor et al. ................ 710/306
2008/0263237 A1* 10/2008 Yamamoto ...................... 710/33
2009/0066705 A1* 3/2009 Casparian et al. ............ 345/503

OTHER PUBLICATIONS

Video Electronics Standards Association, "Proposed DisplayPort Interoperability Guideline," Draft 11, version 1.0, May 7, 2007, 29 pages.

Pericom Semiconductor Corporation, "Digital Video Level Shifter from AC Coupled Digital Video Input to a DVI/HDMI Transmitter," PI3VDP411LS, Oct. 26, 2007, 11 pages.

* cited by examiner

*Primary Examiner* — Alford W Kindred

*Assistant Examiner* — Ernest Unelus

(74) *Attorney, Agent, or Firm* — Larson Newman, LLP

(57) ABSTRACT

A mode of operation of an information handling system is determined based upon configuration information received at a video/graphics port of the information handling system. In response to determining the mode of operation is a first mode of operation, information is provided from the first video/graphics port that represents only a portion of a video image. In response to determining the mode of operation is a second mode of operation, information is provided from the first video/graphics port that represents all of the video image.

14 Claims, 3 Drawing Sheets

VIDEO/GRAPHICS PORT ADAPTER AND METHOD THEREOF

BACKGROUND

1. Field of the Disclosure

This disclosure relates generally to information handling systems, and more particularly to an information handling system that provides image information to a display unit.

2. Description of the Related Art

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Various standards developed with respect to performing certain operations associated with an information handling system change as they become outdated or otherwise replaced with other standards as technology advances or specific operational requirements change. In addition, competing standards can exist. For example, various standards exist that describe physical, operational, and electrical requirements needed to interface a video/graphics port at an information handling system that provides video/graphics information for display to a video/graphics display unit of the information handling system. These differences in standards can render a specific video/graphics display unit inoperable with a specific video/graphics port.

For example, DisplayPort is a video/graphics interface standard put forth by The Video Electronics Standards Association (VESA), while Single-Link Digital Video Interface (DVI) and Dual-Link DVI are video interface standards put forth by an industry consortium, the Digital Display Working Group (DDWG). Video/graphics display units that support one of these standards do not necessarily support the other. In order to support a wide variety of video/graphics interface standards implemented by different display devices, multiple video/graphics ports have been included at video/graphics interface modules of information handling systems. Adaptor plugs, also referred to as cable adapters, have also been developed that can act as a bridge device that provides an appropriate physical, operational, and electrical interface between two different video/graphics interface standards.

For example, VESA has put forth a guideline, referred to herein as the VESA Interoperability Guideline, that describes a video/graphics port that by default is a DisplayPort video/graphics port, but that supports a dual mode of operation, whereby the video/graphics port can detect the presence of a cable adapter at a DisplayPort receptacle connector and configure its operation to receive and provide signals at the DisplayPort receptacle connector in a manner that is operationally consistent with the DVI standard to implement a Single-Link DVI video/graphics port. The guideline also describes an active cable adapter that receives pseudo TMDS/DVI compliant information from a DisplayPort receptacle connector that can also provide DisplayPort information, and buffers and conditions signals to meet the TMDS/DVI standard to generate signals compliant with the Dual-Link DVI standard. However, a cable adapter capable for supporting data flow from a DisplayPort receptacle connector to a Dual-Link DVI receptacle connector can be expensive in terms of silicon, cost and power consumption. A method and information handling system capable of performing this conversion in a expensive costly manner would be useful.

BRIEF DESCRIPTION OF THE DRAWINGS

Embodiments incorporating teachings of the present disclosure are illustrated and described with respect to the drawings presented herein.

DETAILED DESCRIPTION

Figure 1:
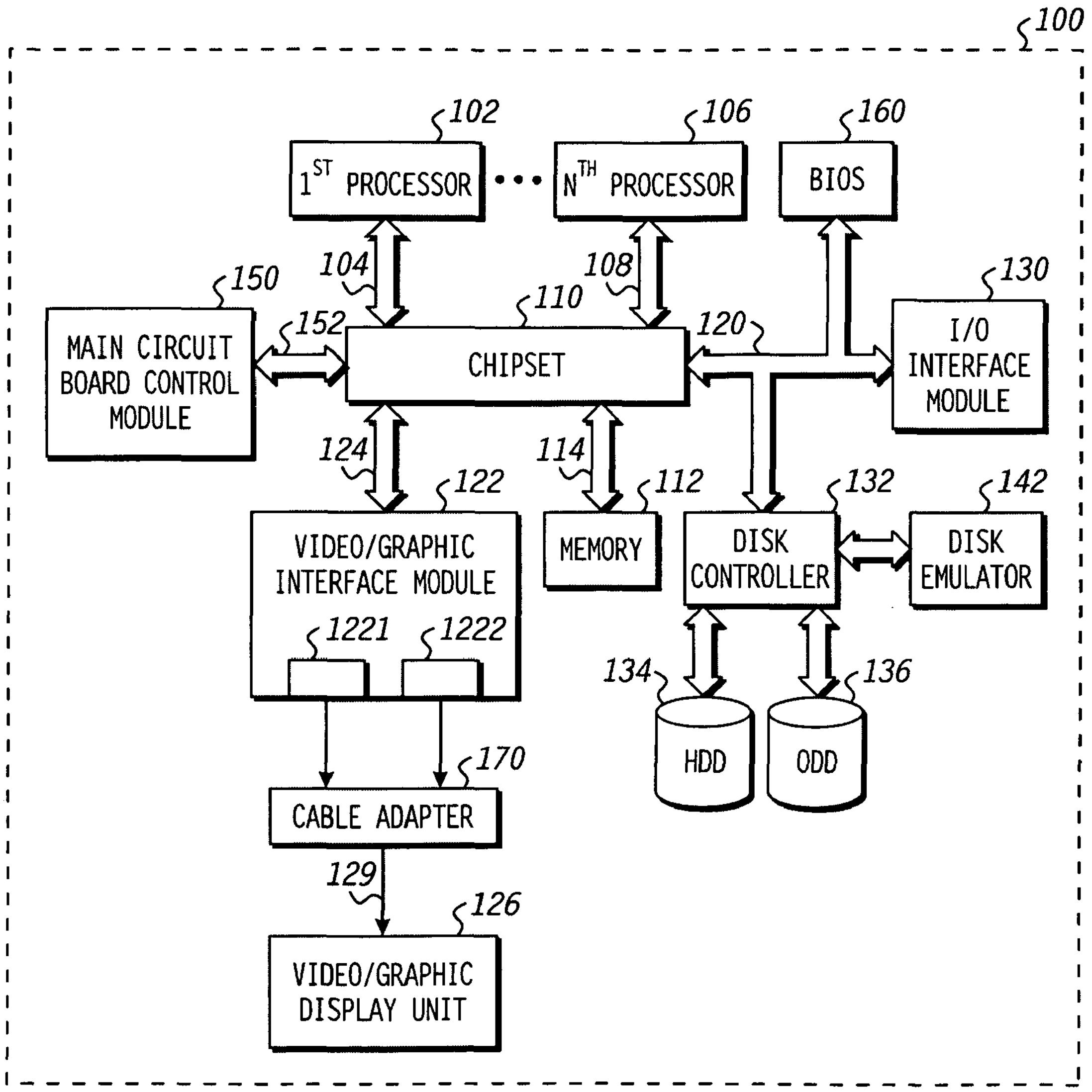
FIG. 1 includes a block diagram of an information handling system including a video/graphics module in accordance with the present disclosure.

The following description in combination with the figures is provided to assist in understanding the teachings disclosed herein. The following discussion will focus on specific implementations and embodiments. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video/graphics display, or any combination thereof. The information handling system can also include one or more buses operable to transmit communications between the various hardware components. Portions of an information handling system can themselves be considered information handling systems.

Portions of an information handling system, when referred to as a "device," a "module," or the like, can be configured as hardware, software (which includes firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. Processor 102 and 106 can be separate physical processors. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between processor 102 and processor 106. For example, the chipset 110 including an AHA enabled-chipset can include a memory controller hub and an input/output (I/O) controller hub. As a memory controller hub, the chipset 110 can function to provide access to processor 102 using host bus 104 and processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and can handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video/graphics interface module 122 that can be connected to the chipset 110 using host bus 124. The video/graphics module 122 includes two or more video/graphics ports, video/graphics port 1221 and video/graphics port 1222, capable of providing image information simultaneously to a common video/graphics display device 126 for simultaneous display as described in greater detail herein. Also, each of the video/graphics ports 1221 and 1222 are capable of providing image information to separate video/graphics devices for simultaneous display. The video/graphics display device 126 is also referred to herein as a display unit 126.

The display unit 126 can include one or more types of video/graphics display devices such as a flat panel display (FPD) or other type of display device. In accordance with the present disclosure, the video/graphics interface module 122 can detect the presence of the cable adapter 170 and configure multiple video/graphics ports, such as DisplayPort video/graphics ports, to operate in tandem along with the cable adapter to implement a Dual-Link DVI video/graphics port.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. For example, the I/O bus 120 can include a Peripheral Component Interconnect (PCI) bus or a high speed PCI-Express bus. In one embodiment, a PCI parallel bus can be operated at approximately 66 MHz and a PCI-Express serial bus can be operated at approximately 2.5 GHz. PCI buses and PCI-Express buses can be provided to comply with industry standards for connecting and communicating between various PCI-enabled hardware devices. Other buses can also be provided in association with, or independent of, the I/O host bus 120 including other industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can further include main circuit board control module 150 that can be connected to the chipset 110 via a system communication bus 152, such as a control bus. The main circuit board control module 150 may reside on a main circuit board, such as a baseboard, a motherboard, or the like. Although not illustrated, other components, such as the processors 102 through 106, the display unit 126, the video/graphics interface module 122, the memory 112, and the disk controller 132 can be connected to the main circuit board control module 150. Commands, communications, or other signals may be sent to or received from the main circuit board control module 150 by any one or combination of components previously described.

The information handling system 100 can also include basic input/output system (BIOS) module 160 that can be connected to the I/O bus 120. The BIOS module 160 is operable to detect and identify components within the information handling system 100 and to provide the appropriate drivers for those components. The BIOS module 160 can be operable during a boot sequence and provide information needed to properly boot the information handling system 100 before, during, and after an operating system for the information handling system 100 is launched.

The information handling system disclosed herein implements a method in conjunction with cable adaptor 170 to configure and interface two video/graphics ports of a source device to a Dual-Link DVI target device, also referred to as a sink device. A specific embodiment of a method and a cable adapter in accordance with the present disclosure will be better understood with reference to FIGS. 2-6.

Figure 2:
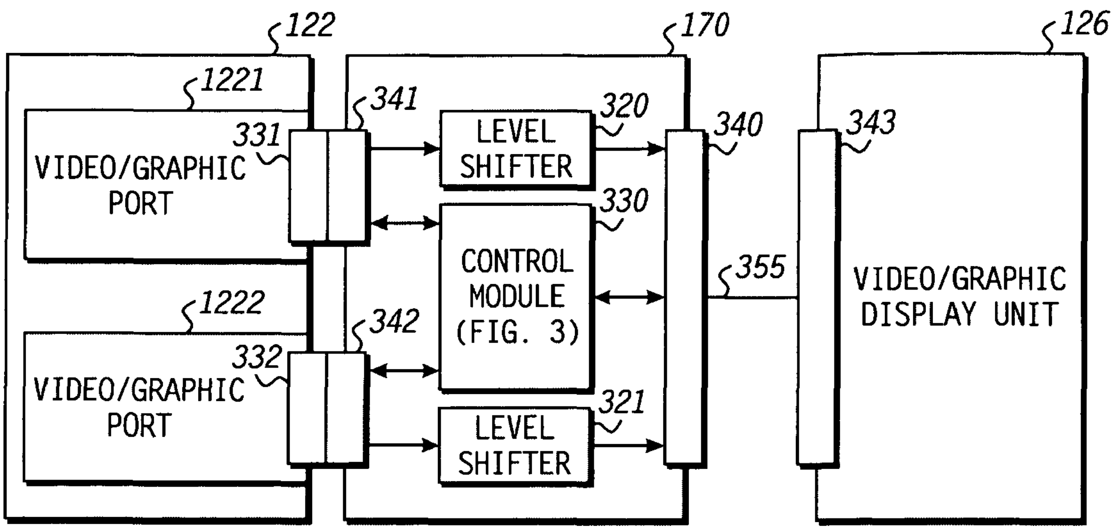
FIG. 2 includes a block diagram illustrating a portion of the information handling system of FIG. 1 in greater detail in accordance with the present disclosure.

FIG. 2 is a block diagram illustrating a more detailed view of video/graphics interface module 122, cable adapter 170, and a display unit 230. The video/graphics interface module 122 illustrates video/graphics port 1221 and its DisplayPort receptacle connector 331, and a video/graphics port 1222 and its DisplayPort receptacle connector 332. It will be appreciated that video/graphics ports of the video/graphics interface module 122 can share common devices. For example, a common graphics processor unit, memory controller, and a common frame buffer can be used to implement both video/graphics port 1221 and video/graphics port 1222.

Cable adapter 170 includes a DisplayPort plug connector 341 connected to video/graphics port 1221, a DisplayPort plug connector 342 connected to video/graphics port 1222, a level shifter 720, a level shifter 721, a control module 330, and a Dual-Link DVI receptacle connector 340 connected to a receptacle connector 343 of video/graphics display unit 126 through a Dual-Link DVI cable assembly 355.

During one mode of operation, each of the video/graphics ports 1221 and 1222 are connected to different video/graphics display units (not shown) and independently provide video/graphics information representing two different complete images to be displayed at the two different video/graphics display units. For example, each of the video/graphics ports 1221 and 1222 can be DisplayPort video/graphics ports, or Dual-Mode video/graphics ports capable of data operation consistent with either a DisplayPort mode or Single-Link DVI mode. During another mode of operation when cable adapter 170 is detected, DisplayPort video/graphics ports 1221 and 1222 operate in tandem to provide a common set of image information operationally consistent with a Dual-Link DVI mode to implement a Dual-Link DVI video/graphics port in conjunction with the cable adapter 170. In the Dual-Link DVI mode a portion of the image is provided from DisplayPort video/graphics receptacle connector 331 and a portion of the image is provided from DisplayPort video/graphics receptacle connector 332.

The DisplayPort plug connector 341 of cable adapter 170 interfaces with the DisplayPort video/graphics receptacle connector 331 of video/graphics port 1221 to receive image information, and to receive and provide control information. Image information is provided from DisplayPort plug connector 341 to level shifter 320 for signal conditioning before being provided to Dual-Link DVI receptacle connector 340. Control information is provided from DisplayPort plug connector 341 to control module 330 for buffering and signal conditioning, as needed, before being communicated to the Dual-Link DVI receptacle connector 340 for display at the video/graphics display unit 126. Control information is provided to DisplayPort plug connector 341 from control module 330 after buffering and signal conditioning, as needed, after being received from the Dual-Link DVI receptacle connector 340 or generated at control module 330.

The DisplayPort plug connector 342 of cable adapter 170 interfaces with the DisplayPort video/graphics receptacle connector 332 of video/graphics port 1222 to receive image information, and to receive and provide control information. Image information is provided from DisplayPort plug connector 342 to level shifter 321 for signal conditioning before being provided to Dual-Link DVI receptacle connector 340. Control information provided from DisplayPort plug connector 342, if any, can be ignored since control information from DisplayPort plug connector 341 can be used to communicate between the source device and a video/graphics display unit. Control information is provided to DisplayPort plug connector 342 from control module 330 as described in further detail herein.

Level shifter 320 receives image information, such as graphics or video data, from the DisplayPort receptacle connector 331 of video/graphics port 1221 that represents only a portion of an image to be provided via Dual-Link DVI receptacle connector 340 to a display unit for display. The image information can be AC-coupled video data provided by video/graphics port 1221 that is compliant with the DVI protocol, but needs to be conditioned to be TMDS compliant data, where TMDS is an acronym for Transition Minimized Differential Signaling, the video protocol utilized by the DVI standard. For example, the image information can be DC biased and otherwise conditioned by the level shifter 320.

Level shifter 321 receives image information, such as graphics or video data, from the DisplayPort receptacle connector 332 of video/graphics graphics port 1222 that represents only a portion of an image to be provided via Dual-Link DVI receptacle connector 340 to a display unit for display. For example, the image information received at level shifter 321 can be the information for the remainder of the image that is not provided by DisplayPort receptacle connector 331 to level shifter 320. The image information can be AC-coupled video data provided by video/graphics port 1222 that needs to be conditioned to be TMDS compliant data. For example, the image information can be DC biased and otherwise conditioned by the level shifter 321.

Control module 330 facilitates serial transfer of control information between video/graphics port 1221 and the video/graphics display unit. Information based upon the Display Data Channel (DDC) protocol is received at control module 330 from the DisplayPort Plug connector 341 for conditioning as needed before being provided to the Dual-DVI plug connector 340. Information based upon the Display Data Channel (DDC) protocol is received at control module 330 from the Dual-link DVI plug connector 340 for conditioning as needed before being provided to the DisplayPort plug connector 342. Additional configuration information is provided from control module 330 to DisplayPort plug connectors 341 and 342 as described herein.

Figure 3:
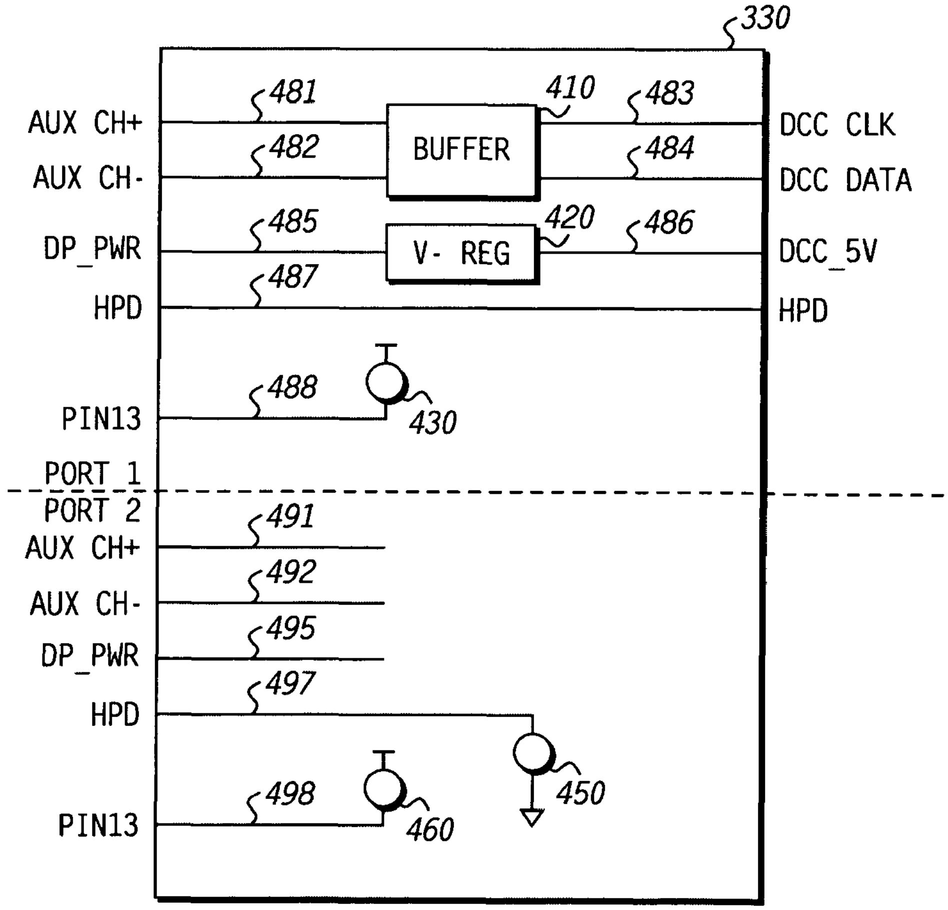
FIG. 3 includes a more detailed block diagram of the cable adapter of FIG. 3.

FIG. 3 provides further detail of the control module 330 of FIG. 2. During operation when the cable adapter 170 is being used to support a Dual-Link DVI video/graphics port, buffer 410 receives a signal at a pin of the DisplayPort plug connector that corresponds to DisplayPort pin AUX CH+, and a signal at a pin of the DisplayPort plug connector that corresponds to DisplayPort pin AUX CH−. However, in the current mode of operation, the video/graphics port 1221 provides to the AUX+ pin a signal that corresponds to DVI signal DCC CLK, and to the AUX− pin a signal that corresponds to DVI signal DDC DATA. Buffer 410 buffers and conditions the received signals before providing the information to the Dual-Link DVI receptacle connector pins DDC CLK and DDC DATA, respectively. Buffer 410 also operates receive and condition information the Dual-Link DVI receptacle connector 340 before providing the information to the DisplayPort receptacle connector.

Voltage regulator 420 receives a signal at a pin of the DisplayPort plug connector that corresponds to DisplayPort pin DP_PWR. The 3.3 volt reference signal received at the DisplayPort pin DP_PWR is provided to the voltage regulator 420, which provides a reference signal, such as a 5 volt reference signal, that is provided to the Dual-Link DVI receptacle connector pin DDC__5V as well as power to the previously described level shifters of buffer 410, as needed.

Node 487 connects the HPD pin of the DisplayPort plug connector 341 directly to the HPD pin of the Dual-Link DVI receptacle connector 340. When no display unit is connected at the Dual-Link DVI receptacle connector 340, the video/graphics port 1221 behaves as if the cable adapter 170 does not exist. Alternatively, an asserted signal HPD is provided to the DisplayPort video/graphics pin HPD when received at the Dual-Link DVI receptacle connector 340 from the video/graphics display unit.

Element 430 is a resistive element attached to the pin labeled PIN13 of the DisplayPort plug connector 341 via node 488 to pull node 488 to a reference voltage, such as DP_PWR, in response to the cable adapter being connected to a video source. This reference voltage can be interpreted as an asserted cable detect signal at video/graphics display port 1221 during a configuration operation.

Nodes 491, 492, and 495 represent DisplayPort video/graphics pins AUXCH+, AUXCH−, and DP_PWR, respectively, for DisplayPort plug connector 342 that have duplicate functionality with respect to a Dual-Link DVI video/graphics port with pins of DisplayPort video/graphics port 341 and are therefore not implemented.

Element 450 is a resistive element attached to the pin labeled HPD of the DisplayPort plug connector 342 via node 497 to pull node 497 to a reference voltage, such as ground, in response to the cable adapter being connected to a video source. This reference voltage can be interpreted as an asserted cable detect signal at video/graphics display port 1222 during a configuration operation.

Element 460 is a resistive element attached to the pin labeled PIN13 of the DisplayPort plug connector 342 via node 498 to pull node 498 to a reference voltage, such as DP_PWR, in response to the cable adapter being connected to a video source. This reference voltage can be interpreted as an asserted cable detect signal at video/graphics display port 1222 during a configuration operation.

When cable adapter 170 is connected to video/graphics display unit 126 and to video/graphics ports 1221 and 1222 during start up, pin HPD of DisplayPort plug connector 341 will be at a logic high-voltage, PIN13 of DisplayPort plug connector 341 will be at a logic high voltage, pin HPD of DisplayPort plug connector 342 will be at a logic low voltage, PIN13 of DisplayPort plug connector 342 will be at a logic high voltage.

In response to this state combination on the HPD pins and PIN13 pins at video/graphics ports 1221 and 1222, a control portion of the video/graphics ports 1221 and 1222, such as a common Graphics Processor Unit (GPU) controller, will determine than video/graphics ports 1221 and 1222 of the information handling system is in a Dual-Link DVI mode of operation.

In response to determining the mode of operation is the Dual-Link DVI mode of operation video/graphics port 1221 will be configured to provide video information at nodes corresponding to DisplayPort receptacle connector pins LANE0-LANE3 that is logically compliant with DVI video information that would be provided to pins CHANNEL2-CHANNEL0 and CHANNEL CLK of a Dual-Link DVI receptacle connector. Video/graphics port 1221 will also be configured to provide serial data at pins corresponding to DisplayPort receptacle connector pins AUX+ and AUX− that are logically compliant with DVI video information that would be provided to pins DDC CLK and DDC DATA of a Dual-Link DVI receptacle connector.

In response to determining the mode of operation is the Dual-Link DVI mode of operation video/graphics port 1222 will be configured to provide video information at nodes corresponding to DisplayPort receptacle connector pins LANE0-LANE3 that is logically compliant with DVI video information that would be provided to pins CHANNEL5 -CHANNEL3 and CHANNEL CLK of a Dual-Link DVI receptacle connector. Other pins of video/graphics port 1222 are not needed.

The cable adaptor 170 receives the information from the DisplayPort 1221 and 1222 that is operationally compliant with information provided to a Dual-Link DVI receptacle and provides signal conditioning, such as level shifting AC-coupled signals to have DC offsets compliant with TMDS signals, before providing the information to the Dual-Link DVI receptacle connector.

Figure 4:
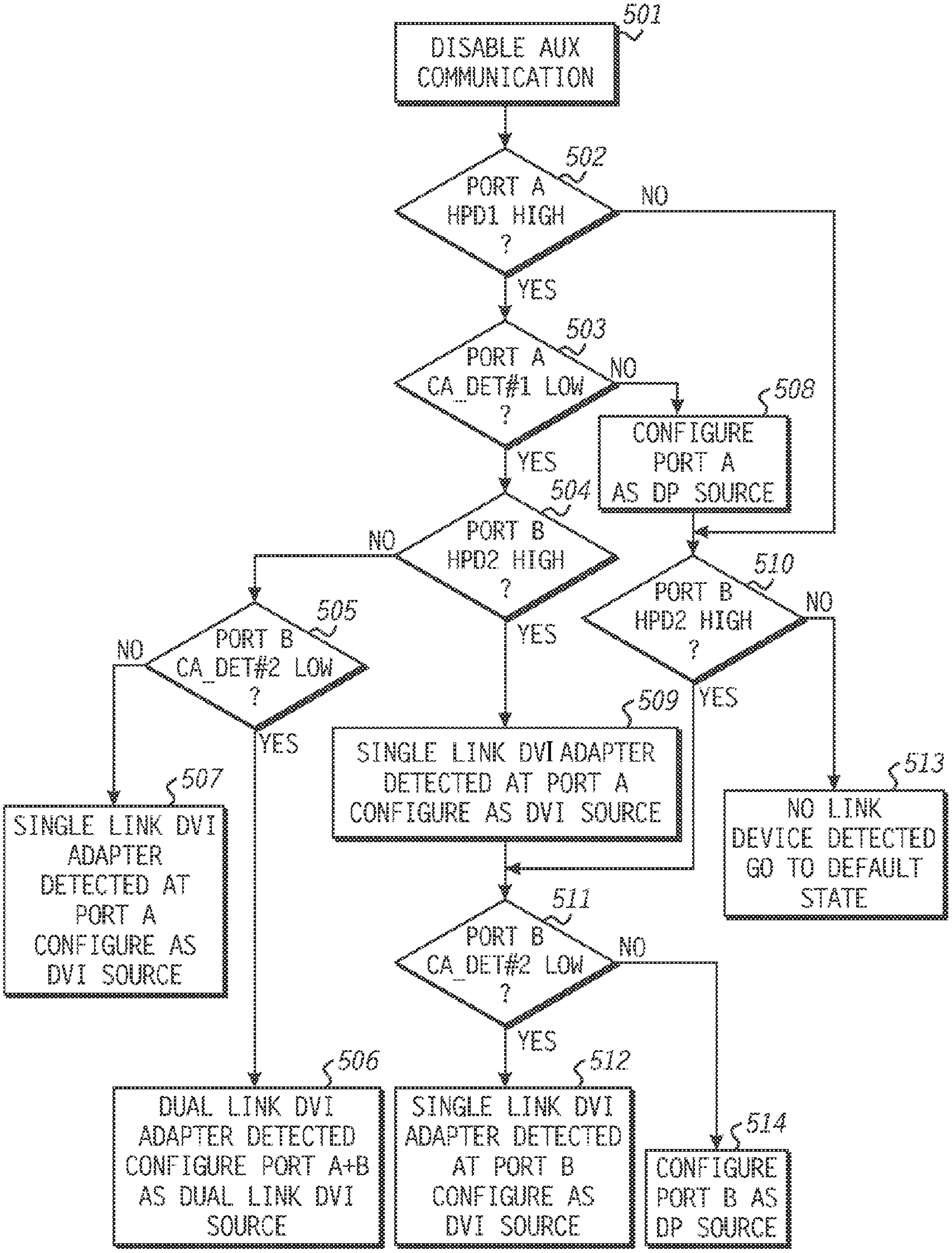
FIG. 4 includes a flow diagram illustrating a method in accordance with a present embodiment of the present disclosure.

FIG. 4 is a flow diagram that illustrates a method in accordance with a specific embodiment of the present disclosure through which the information handling system can receive configuration information to determine and set a mode of operation. With respect to FIG. 5, signal HPD at pin HPD of DisplayPort receptacle connector 331 will be referred to as HPD1, signal HPD at pin HPD of DisplayPort receptacle connector 332 will be referred to as HPD2, a signal at PIN13 of DisplayPort receptacle connector 331 will be referred to as CA_DET#1, a signal at PIN13 of DisplayPort receptacle connector 332 will be referred to as CA_DET#2, video/graphics port 1221 will be referred to as port A, and video/graphics port 1222 will be referred to as port B.

The flow of FIG. 4 begins at block 501 where the information handling system disables DisplayPort AUX communications. This can occur as the result of a reset of the information handling system, such as at power up. From Block 501 flow proceeds to decision block 502 to evaluate received configuration information at port A by determining a state of HPD1. If HPD1 is at a high-voltage state, an asserted Hot Plug Detect signal is detected and flow proceeds to decision block 503. If HPD1 is at low-voltage state, a negated Hot Plug Detect signal is detected and the flow proceeds to decision block 510.

Decision block 503 evaluates received configuration information by determining a state of CA_DET#1. If CA_DET#1 is at a high-voltage state, then an asserted Cable Detect signal is detected and the flow proceeds to decision block 504. If CA_DET#1 is at a low-voltage state, then a negated Cable Detect signal is detected and the flow proceeds to block 508, where port A is configured as a DisplayPort video/graphics port, AUX CH communication is enabled, and the flow proceeds to decision block 510.

Decision block 504 evaluates received configuration information by determining a state of HPD2 at port B. If HPD2 is at a low-voltage state, then a negated Hot Plug Detect signal is detected and the flow proceeds to decision block 505. If HPD2 is at a high-voltage state, then an asserted Hot Plug Detect signal is detected and the flow proceeds to block 509 where port A is configured as a Single-Link DVI video/graphics port and the flow proceeds to decision block 511.

Decision block 505 evaluates received configuration information by determining a state of CA_DET#2 at port B. If CA_DET#2 is at a low-voltage state, then a negated Cable Detect signal is detected and the flow proceeds to block 507 where port A is configured as a Single-Link DVI source. If CA_DET#2 is at a high-voltage state, then an asserted Cable Detect signal is detected and the flow proceeds to block 506 where port A and port B are configured as a Dual-Link DVI source as described herein, whereby DDC communications is enabled.

Decision block 510 evaluates received configuration information by determining a state of HPD2 at port B. If HPD2 is at a high-voltage state, then an asserted Hot Plug Detect signal is detected and the flow proceeds to block 511. If HPD2 is at a low-voltage state, then a negated Hot Plug Detect signal is detected and the flow proceeds to block 513 and no sink device is present on either video/graphics port and the graphics interface enters a default state. Flow can return to block 501 from block 513.

Decision block 511 evaluates received configuration information by determining a state of CA_DET#2 at port B. If CA_DET#2 is at a high-voltage state, a negated Cable Detect signal is detected and then the flow proceeds to block 512, where port B is configured as a Single-Link DV1 port and DDC communications is enabled. If CA_DET#2 is at a low-voltage state, then a negated Cable Detect signal is detected and the flow proceeds to block 514 where port B is configured as a DisplayPort port.

Based upon the configuration information, the information handling system can determine a specific mode of operation is a Dual-Link DVI mode of operation at port A and port B by detecting the cable adapter when attached to the video/graphics ports and configure the ports accordingly, or determine the specific mode of operation is a DisplayPort mode of operation at port A and at port B. Note if the video/graphics module 122 supports Dual-Mode DisplayPort and Single-Link DVI operation, as implied at FIG. 4, then another specific mode of operation is Single-Link DVI mode of operation.

Based upon the method of FIG. 5, it will be appreciated that if the source side of the previously described cable adapter is attached to the video/graphics ports of the information handling system, and a Dual-Link DVI display unit is attached to the sink side of the cable adapter, then HPD1 will be set high, CA_DET#1 will be set high, HPD2 will be set low, and CA _DET#2 will be set high. Upon receiving this configuration information, the mode of operation of the information handling system will be determined, wherein video/graphics port 1221 and video/graphics port 1222 are configured to each output only a portion of the video image to be displayed at the Dual-Link display device. The cable adapter receives and conditions the video data and control and communications data from each video/graphics port and presents the complete video image to the display unit in adherence with the Dual-Link DVI standard protocol. For example, the video/graphics interface module 221 will route pixel information representing the image in alternate order to video/graphics port 1221 and video/graphics port 1222, such as even pixels to one port and odd pixels to the other port, in accordance with the Dual-Link DVI specification.

If a different mode of operation is determined other that Dual-Link video/graphics mode, then video/graphics ports 1221 and 1222 will be configured accordingly, whereby video/graphics ports 1221 and 1222 can be configured independently to provide the complete video image utilizing either DisplayPort protocol, or Single-Link DVI protocol if Dual-Mode is supported.

The term Single-Link DVI as used herein refers to various aspects of a standard referred to as Digital Video Interface (DVI) put forth by an industry consortium, the Digital Display Working Group (DDWG). A Single-Link DVI video/graphics port as used herein refers to one or more devices having a functional set of interconnects that when connected to a Single-Link DVI receptacle connector meets the physical, operational, and electrical requirements of the Single-Link DVI standard. A Dual-Link DVI video/graphics port as used herein refers to one or more devices having a functional set of interconnects that when connected to a Dual-Link DVI receptacle connector meets the physical, operational, and electrical requirements of the Single-Link DVI standard. The term DisplayPort as used herein refers to various aspects of as standard referred to as DisplayPort put forth by The Video Electronics Standards Association (VESA)—Digital Visual Interface (DVI) Revision 1.0, DDWG (Digital Display Working Group), Apr. 2, 1999. A DisplayPort video/graphics port as used herein refers to one or more devices having a functional set of interconnects that when connected to a DisplayPort receptacle connector meets the physical, operational, and electrical requirements of the VESA standard—DisplayPort Standard Version 1 Revision 1a, VESA, Jan. 11, 2008.

It will be appreciated that the methods and devices described in this disclosure do not require an active protocol converter capable of logically translating DVI compliant information to DVI compliant information, and therefore can be less costly than adapters having such capability. For example, a cable adapter utilizing an active protocol converter will require additional power, and may requires an external power supply due to the 1.5 watt power limitation provided by the DisplayPort interface standard. The cable adapter herein disclosed does not require an external power supply.

Although only a few exemplary embodiments have been described in detail above, those skilled in the art will readily appreciate that many modifications are possible in the exemplary embodiments without materially departing from the novel teachings and advantages of the embodiments of the present disclosure. For example, it will be appreciated that the configuration information, encoded via fixed reference signals, represents only one of many possible implementations whereby the information handling system can perform the discovery means to receive configuration information to determine the mode of operation. For example, the configuration information described above was static information received at pins of a DisplayPort receptacle connector. In another embodiment, receiving a dynamic signal is an alternative for receiving configuration information. For example, EDID (Extended Display Identification Data) polling through the DDC communications protocol to transmit information serially in lieu of CA_DET# pin evaluation can be used. Another approach using dynamic signals for receiving configuration information is to attempt a DisplayPort AUX CH transaction from each video/graphics port, and upon detecting a Hot Plug Detect and upon failure, attempt a DDC transaction. A failed AUX CH transaction followed by a successful DDC transaction at a video/graphics port can be interpreted as having the same affect as an asserted CA_DET# as previously discussed.

Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:

receiving configuration information at a first video/graphics port receptacle connector of an information handling system, the configuration information comprises a fixed logic state, and the first video/graphics port receptacle connector is to connect the information handling system to a video/graphics display unit;

determining a mode of operation of the information handling system based upon the configuration information;

in response to determining the mode of operation is a Dual-Link Digital Video Interface (DVI) mode of operation, providing information from the first video/graphics port receptacle connector that represents only a portion of a video image; and in response to determining the mode of operation is a Single-Link DVI mode of operation or a DisplayPort mode of operation, providing information from the first video/graphics port receptacle connector that represents all of the video image.

2. The method of claim 1, wherein the fixed logic state is received at a pin PIN13 of the first video/graphics port receptacle connector, wherein the first video/graphics port receptacle connector is a DisplayPort receptacle connector.

3. The method of claim 1, wherein the fixed logic state is received at a pin HPD of the first video/graphics port receptacle connector, wherein the first video/graphics port receptacle connector is a DisplayPort receptacle connector.

4. The method of claim 1, wherein the fixed logic state is based on a static reference voltage at a pin of the video/graphics port receptacle connector.

5. A method comprising:

receiving configuration information at a first video/graphics port receptacle connector of an information handling system, the first video/graphics port receptacle connector is to connect to a video/graphics display unit;

determining a mode of operation of the information handling system based upon the configuration information;

in response to determining the mode of operation is a Dual-Link Digital Video Interface (DVI) mode of operation, providing information from the first video/graphics port receptacle connector that represents only a portion of a video image; and in response to determining the mode of operation is a Single-Link DVI mode of operation or a DisplayPort mode of operation, providing information from the first video/graphics port receptacle connector that represents all of the video image.

6. The method of claim 5, wherein receiving the configuration information comprises determining an attempt at an AUX CH transaction has failed.

7. The method of claim 5 further comprises:

receiving configuration information at a second video/graphics port receptacle connector of the information handling system, the second video/graphics port receptacle connector is to connect to the video/graphics display unit; and determining the mode of operation further comprises determining the mode of operation based upon the configuration information at the second video/graphics port receptacle connector.

8. The method of claim 7 further comprising, in response to determining the mode of operation is the Dual-Link DVI mode of operation, providing information from the second video/graphics port receptacle connector that represents only a portion of a video image, wherein the information from the first video/graphics port receptacle connector and the information from the second video/graphics port receptacle connector represent all of the video image.

9. The method of claim 7 further comprising:

in response to determining the mode of operation is the DisplayPort mode of operation, providing information from the first video/graphics port receptacle connector that represents all of the video image.

10. The method of claim 9, wherein determining the mode of operation comprises determining the mode of operation is the DisplayPort mode of operation in response to the configuration information comprising a first logic state at a Hot Plug Detect pin of the first video/graphics port receptacle connector, and a second logic state at a Cable Adapter Detect pin of the first video/graphics port receptacle connector, and wherein the first video/graphics port receptacle connector is a DisplayPort receptacle connector.

11. The method of claim 5, wherein the configuration information comprises a fixed logic state.

12. The method of claim 11, wherein the fixed logic state is received at a pin PIN13 of a DisplayPort receptacle connector.

13. The method of claim 5, wherein determining the mode of operation comprises determining the mode of operation is the Dual-Link DVI mode of operation in response to the configuration information comprising a first logic state at a first Hot Plug Detect pin of the first video/graphics port receptacle connector, at a Cable Adapter Detect pin of the first video/graphics port receptacle connector, and at a Cable Adapter Detect pin of a second video graphics/port receptacle connector, and the configuration information comprising a second logic state at a Hot Plug Detect pin of the second video/graphics port receptacle connector, the first and second video/graphics port receptacle connectors are DisplayPort receptacle connectors.

14. A method comprising:

receiving configuration information at a first video/graphics port of an information handling system, the configuration information comprises a fixed logic state;

determining a mode of operation of the information handling system based upon the configuration information;

in response to determining the mode of operation is a Dual-Link Digital Video Interface (DVI) mode of operation, providing information from the first video/graphics port that represents only a portion of a video image; and in response to determining the mode of operation is a Single-Link DVI mode of operation or a DisplayPort mode of operation, providing information from the first video/graphics port that represents all of the video image.

* * * * *